UNITED STATES PATENT OFFICE.

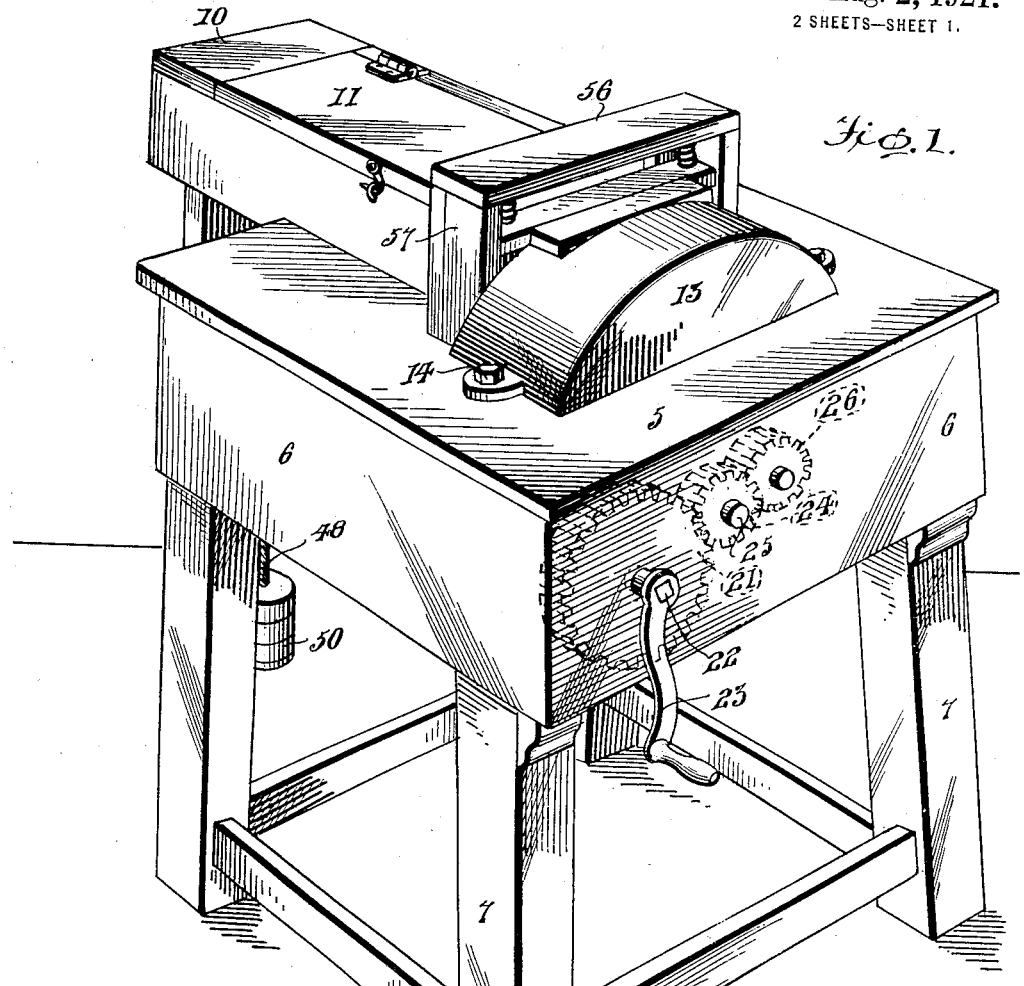

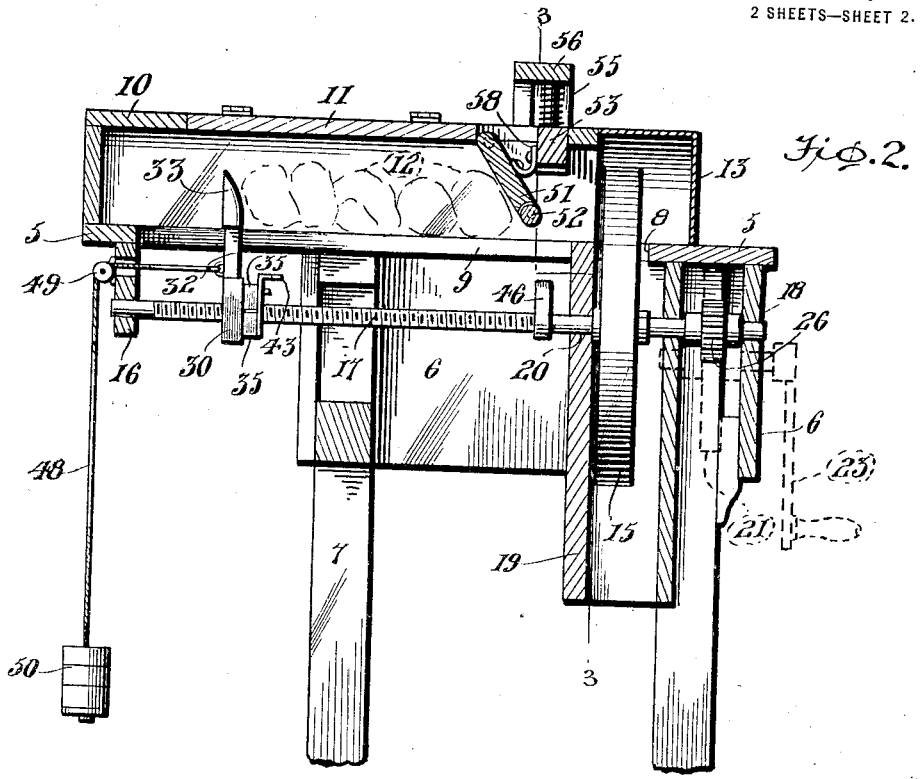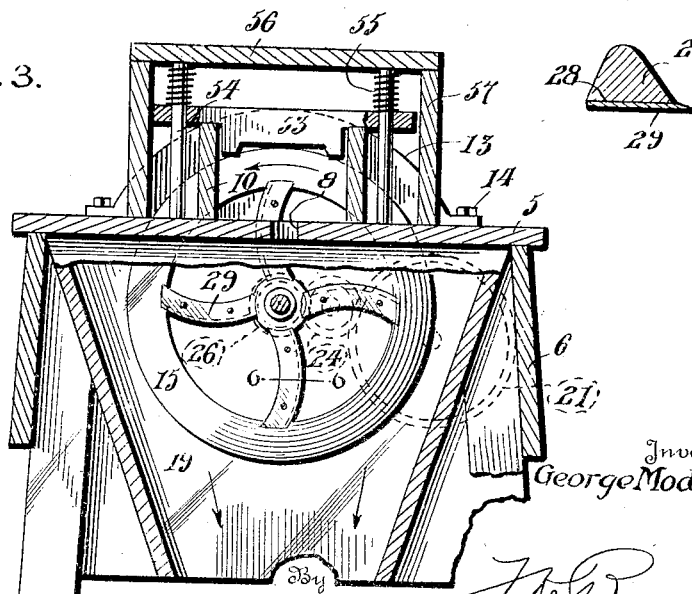

GEORGE MODNICKI, OF TOLEDO, OHIO.

FRUIT AND VEGETABLE CUTTER.

1,386,349. Specification of Letters Patent. Patented Aug. 2, 1921.

Application filed May 11, 1921. Serial No. 468,502.

*To all whom it may concern:*

Be it known that I, GEORGE MODNICKI, a citizen of Poland, residing at Toledo, in the county of Lucas and State of Ohio, have invented certain new and useful Improvements in Fruit and Vegetable Cutters, of which the following is a specification.

This invention relates to certain new and useful improvements in fruit and vegetable cutters of that type embodying a rotary cutting member.

The primary object of the invention is to provide a cutter of the above kind wherein means is provided for automatically feeding the vegetable or fruit to the cutter member and wherein an improved construction of the feeding means provides for automatic release thereof when the same reaches its extreme inward movement.

Another object of the invention is to provide means for automatically returning the feeding means to its starting position for being released.

Still another object of the invention is to provide means for yieldably resisting movement of the fruit or vegetables toward the cutter member by the feeding means so as to keep the fruit or vegetable in proper position and to hold the same in proper engagement with the cutter member as the latter slices said fruit or vegetable.

Other objects will appear as the nature of the invention is better understood, and the same consists of the novel form, combination and arrangement of parts hereinafter more fully described, shown in the accompanying drawings and claimed.

In the drawings, wherein like reference characters designate corresponding parts throughout the several views, Figure 1 is a perspective view of a vegetable cutter constructed in accordance with the present invention, Fig. 2 is a central longitudinal sectional view thereof partly broken away, Fig. 3 is a vertical transverse sectional view taken upon line III—III of Fig. 2, Fig. 4 is a perspective view of the moving member of the vegetable feeding means with the feed screw and feed release trip associated therewith as indicated by dotted lines, Fig. 5 is a perspective view of the hinged member of the means for resisting movement of the vegetables to the cutter member, and Fig. 6 is an enlarged sectional view of one of the cutting knives taken upon line IV—IV of Fig. 3.

Referring more in detail to the several views, the device embodies a table-like structure preferably embodying a top member 5 with marginal finished strips 6 and supported at a suitable elevation by braced supporting legs 7 provided at the corners, a transverse slot 8 being provided in the top 5 adjacent one end thereof, and a longitudinal elongated slot 9 being provided in said top from a point adjacent the other end to a point adjacent said transverse slot 8.

A magazine preferably in the form of a rectangular housing 10 is provided on the top 5 above the slot 9 and this housing is provided with a hinged lid or other suitable closure 11 for permitting ready insertion of the vegetable or fruit as at 12 within the magazine so as to rest upon the portion of the top 5 adjacent said slot 9. The forward end of the magazine 10 is open and communicates with the interior of a suitable metallic hood or casing 13 which is secured upon the top 5 above the slot 8 so as to completely cover the latter by means of screws 14 or the like, thus permitting access to a rotary cutter member 15 which is journaled beneath said transverse slot 8 and which partially projects up through the slot 8 in advance of the open end of the magazine. The magazine 10 preferably projects beyond one end of the top 5 as clearly shown in Figs. 1 and 2 and the same is provided with a depending rigid bracket as at 16 in which the rear end of a rotary feed screw 17 is journaled, the feed screw 17 being arranged centrally and longitudinally of the top 5 beneath the latter and directly under the slot 9 and having its forward end journaled as at 18 in the front finishing strip 6. A tapered chute 19 is fixed to the underneath of the top 5 with its passage communicating with the slot 8 and so that said chute incases the lower portion of the cutter member 15, the feed screw 17 being journaled in the opposite sides of the chute 19 as at 20.

Means is provided for imparting rotation to the feed screw 17 and the same preferably consists of a large spur gear 21 mounted upon a suitable shaft 22 which is journaled in the forward strip 6 and the adjacent side of the chute 19, which shaft 22 is adapted for reception of a hand crank 23 upon its outer projecting end. The spur gear 21 meshes with a spur pinion 24 which is fixed upon a shaft 25 journaled beside the shaft 22 and the pinion 24 in turn meshes with another pinion 26 fixed upon the forward end portion of the feed screw 17. It will be seen that the gear 21 and pinions 24 and 26 are located between the front or forward finished strip 6 and the adjacent side of the chute 19 so that said gears are effectively protected and catching of the operator's clothing therein is prevented.

The cutter member 15 is in the nature of a heavy spoked wheel fixed upon the portion of the feed screw 17 which is between the sides of the hopper 19, the spokes being denoted by the numeral 27 and having one face flat as shown clearly at 28 in Fig. 6, which face is directed toward the open end of the magazine 10 and has a cutting blade 29 flatly fastened thereagainst, one blade being provided for each spoke and the blades also being of curved form as shown in Fig. 3. By reason of the weighted construction of the cutter, said cutter may be easily rotated and continued rotation is had from the momentum for a period of time.

The means for feeding the vegetables to the cutter member embodies a block 30 having a central opening as at 31 (see Fig. 4) through which the feed screw 17 slidably extends, and a post 32 is rigid with and extends upwardly from the block 30 and has a large transverse head 33 on the upper end thereof, the post 32 extending through the slot 9 and the head 33 being disposed above the top 5 within the magazine 10 so as to engage behind the rearmost vegetable as shown clearly in Fig. 2. A pair of jaws 34 and 35 respectively are hinged at their ends as at 36 and 37 at one side of the opening 31, and these jaws are provided with semi-circular recesses 38, the walls of which are threaded so as to engage the threads of the feed screw 17 when the jaws are brought together, the jaws thus acting substantially as split halves of a feed nut, and said jaws being normally opened and thereby freed from the feed screw by means of a tension spring 39 having its opposite ends attached to suitable ears 40 on the pivoted ends of the jaws. The jaw 35 is provided with a laterally projecting pin 41 adapted for reception within the slot 42 of a catch 43 which is pivoted as at 44 to the other jaw 34 for holding the jaws together with the threads thereof engaging the threads of the feed screw, and a flexible member 45 connects the catch 43 with the post 32 for preventing said catch and the jaw 34 from moving an undue distance away from the jaw 35. In a like manner, upward swinging of the jaw 35 is limited by passing said flexible member 45 around the pin 41.

A radially extending trip arm 46 is fixed upon the feed screw 17 adjacent the forward end of the slot 9, the outer end of said arm 46 being so located as to engage the edge 47 of the catch 43 when the block 30 has moved a sufficient distance toward the cutter, and upon continued rotation of the feed screw, the arm 46 will cause outward swinging of the catch 43 to disengage the latter from the pin 41 so that the spring 39 will automatically separate the jaws 34 and 35 and cessation of the feeding movement of the head 33 will immediately discontinue. In this way excessive feeding movement is prevented so as to avoid breakage of parts, and a flexible member 48 is attached to the post 32 and extends rearwardly and around a guide roller 49 carried by the bracket 16 and has a weight 50 fastened upon the depending end thereof so that the head 33 and parts movable therewith will be immediately returned to starting position upon release of the jaws 34 and 35.

A pivoted presser plate 51 is disposed across the open end portion of the magazine 10 with its lower edge free and so as to be capable of swinging upwardly for permitting passage of the vegetables to the cutter member 15 under the force exerted by movement of the head 33 toward said cutter member, and in order to prevent wedging or bruising of the vegetables, a roller 52 is mounted at the lower edge of said plate 51. A spring pressed follower 53 is slidably mounted for vertical movement on posts 54 at opposite sides of the open end portion of the magazine 10, and said follower projects through a suitable slot provided in the top of the magazine and is normally held in lowered position by means of compression springs 55 which preferably encircle the posts 54 between said follower and a cross bar 56 which is horizontally disposed above the follower and connected at its ends to upright members 57 suitably fixed upon the table 5 outwardly of the posts 54. The follower 53 is limited in downward movement by engagement of the same with the upper edges of the side walls of the magazine 10 as shown clearly in Fig. 3, and this follower is connected with the presser plate 51 by means of a flexible strap 58 of leather or the like so that the force of the springs 55 is exerted upon the plate 51 for resisting the feeding movement of the vegetables to a slight extent, the leather strap 58 providing a sensitive cushion between the follower and the plate 51, which sensitive cushion will yield and upon continued movement of the vegetable adjacent the cutter member, the plate 51 will engage the follower 53 and force the same upwardly against the action of the springs 55.

In operation, vegetables or the like are placed within the magazine 10 with the head 33 disposed as shown in Fig. 2, and with the catch 43 engaged with the pin 41. Rotation is then imparted to the feed screw 17 through the gearing described and forward movement of the head 33 is thereby caused for forcing the vegetables to the cutter knives 29. As the knives 29 rotate with the feed screw, the vegetables are continuously cut as they are fed forwardly and sliced vegetables will fall by gravity through the chute 19 from which they may pass into any suitable receptacle disposed beneath said chute. When the edge 47 of the catch 43 comes in the path of the arm 46, said catch will be released from the pin 41 and movement of the head 33 will cease, whereupon the weight 50 will immediately return the head 33 to starting position. As will be evident the improper crowding of the vegetables will be prevented by means of the plate 51 and follower 53, while said vegetables will be firmly held in position for operation of the knives 29 thereon for insuring uniform slicing.

From the foregoing description it is believed that the construction and operation as well as the advantages of the present invention will be readily understood and appreciated by those skilled in the art.

What is claimed as new is:—

1. In combination with a rotatable cutter and means for feeding vegetables thereto, means for simultaneously operating said cutter and said feeding means, of means to automatically render said feeding means inoperative upon approach of said feeding means to a point adjacent said cutter, said feeding means embodying a pair of split nut members, a feed screw, means to normally hold said nut members in engagement with said screw, and means rotatable with the screw and engageable with said retaining means to release the latter.

2. In combination with a rotatable cutter and means for feeding vegetables thereto, means for simultaneously operating said cutter and said feeding means, of means to automatically render said feeding means inoperative upon approach of said feeding means to a point adjacent said cutter, said feeding means embodying a pair of split nut members, a feed screw, means to normally hold said nut members in engagement with said screw, means rotatable with the screw and engageable with said retaining means to release the latter, said nut members comprising a pair of pivoted jaw members, and means to normally yieldably separate said jaw members.

3. In combination with a rotatable cutter and means for feeding vegetables thereto, means for simultaneously operating said cutters and said feeding means, of means to automatically render said feeding means inoperative upon approach of said feeding means to a point adjacent said cutter, said feeding means embodying a pair of split nut members, a feed screw, means to hold said nut members in engagement with said screw, means rotatable with the screw and engageable with said retaining means to release the latter, said nut members comprising a pair of pivoted jaw members, and means to normally yieldably separate said jaw members, said feeding means further including a block longitudinally slidable upon the feed screw and upon which said jaw members are pivoted.

4. In combination with a rotatable cutter and means for feeding vegetables thereto, means for simultaneously operating said cutter and said feeding means, of means to automatically render said feeding means inoperative upon approach of said feeding means to a point adjacent said cutter, said feeding means embodying a pair of split nut members, a feed screw, means to hold said nut members in engagement with said screw, means rotatable with the screw and engageable with said retaining means to release the latter, said nut members comprising a pair of pivoted jaw members, means to normally yieldably separate said jaw members, said feeding means further including a block longitudinally slidable upon the feed screw and upon which said jaw members are pivoted, a vegetable supporting top member having a longitudinal slot, a post rigid with and projecting outwardly from said block through said slot, and a vegetable engaging head rigid with the upper end of said post.

5. In a vegetable cutter wherein vegetable feeding and cutting means is provided, means for resisting feeding movement of the vegetables to the cutter embodying a pivoted blade mounted upon a horizontal axis, a vertically movable follower normally spring pressed in a downward direction, and a cushioned flexible connection between said follower and said pivoted blade.

In testimony whereof I affix my signature in presence of two witnesses.

GEORGE MODNICKI.

Witnesses:
JOSEPH J. KRAUSE,
JOSEPH KALUCKI.